United States Patent
Healey et al.

(10) Patent No.: US 8,824,900 B2
(45) Date of Patent: Sep. 2, 2014

(54) OPTICAL SINGLE-SIDEBAND TRANSMITTER

(75) Inventors: Peter Healey, Ipswich (GB); David William Smith, Woodbridge (GB); Graeme Douglas Maxwell, Ipswich (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 13/256,861

(22) PCT Filed: Mar. 18, 2010

(86) PCT No.: PCT/GB2010/050463
§ 371 (c)(1),
(2), (4) Date: Sep. 15, 2011

(87) PCT Pub. No.: WO2010/106368
PCT Pub. Date: Sep. 23, 2010

(65) Prior Publication Data
US 2012/0002978 A1  Jan. 5, 2012

(30) Foreign Application Priority Data
Mar. 18, 2009 (GB) .................................. 0904600.4

(51) Int. Cl.
*H04B 10/04* (2006.01)
*H04B 10/50* (2013.01)
*H04B 10/516* (2013.01)
*G02F 1/225* (2006.01)
*H04L 27/04* (2006.01)
*G02F 1/21* (2006.01)

(52) U.S. Cl.
CPC ........ *H04B 10/5053* (2013.01); *H04B 10/5165* (2013.01); *G02F 2001/215* (2013.01); *G02F 1/225* (2013.01); *H04L 27/04* (2013.01)
USPC ........... 398/185; 398/186; 398/188; 398/201; 398/182

(58) Field of Classification Search
USPC ......................................................... 398/183
See application file for complete search history.

(56) References Cited

U.S. PATENT DOCUMENTS

| | | | |
|---|---|---|---|
| 3,379,887 A | | 4/1968 | Stephany |
| 4,257,016 A | * | 3/1981 | Kramer et al. ................ 359/305 |
| 4,915,468 A | | 4/1990 | Kim et al. |
| 5,155,617 A | * | 10/1992 | Solgaard et al. .............. 359/245 |
| 6,275,625 B1 | * | 8/2001 | Bergmann ...................... 385/18 |
| 6,616,353 B1 | * | 9/2003 | Helkey .......................... 398/183 |
| 7,570,409 B1 | * | 8/2009 | Wang et al. ................... 359/237 |

(Continued)

OTHER PUBLICATIONS

Written Opnion and Search Report of the International Searching Authority received in Patent Cooperation Treaty Application No. PCT/GB2010/050463, mailed Jun. 22, 2010, 7 pages.

(Continued)

*Primary Examiner* — Ken Vanderpuye
*Assistant Examiner* — David Lambert
(74) *Attorney, Agent, or Firm* — Slater & Matsil, L.L.P.

(57) ABSTRACT

A method for generating an optical single sideband signal comprising the steps of splitting an optical field into two parts and introducing a relative phase delay of $+/-\pi/4$ radians in each direction of transmission to one of the parts, intensity reflection-modulating each part with electrical signals having a relative phase delay of $+/-\pi/2$ radians and then recombining the reflection-modulated signals.

19 Claims, 2 Drawing Sheets

(56) References Cited

U.S. PATENT DOCUMENTS

| | | |
|---|---|---|
| 2002/0141694 A1* | 10/2002 | Caplan et al. .................... 385/24 |
| 2002/0149826 A1* | 10/2002 | Tanaka et al. ................... 359/181 |
| 2002/0171900 A1* | 11/2002 | Ono et al. ...................... 359/181 |
| 2003/0189745 A1 | 10/2003 | Kikuchi et al. |
| 2004/0228635 A1 | 11/2004 | Price |
| 2005/0254061 A1* | 11/2005 | Alphonse ....................... 356/479 |
| 2007/0047668 A1 | 3/2007 | Kim et al. |
| 2007/0212075 A1 | 9/2007 | Yin |
| 2009/0022445 A1* | 1/2009 | Hochberg et al. .................. 385/3 |
| 2009/0067843 A1* | 3/2009 | Way et al. ....................... 398/79 |

OTHER PUBLICATIONS

International Search Report corresponding to International Application No. PCT/GB2010/050463 dated Jun. 15, 2010.

Presi et al., "A full-duplex symmetric WDM-PON featuring OSSB downlink modulation with optical down-conversion", Optical Fiber Communication/National Fiber Optic Engineers Conference, Feb. 24, 2008, pp. 1-3.

Chinese Search Report received in Application No. 2010800125774, mailed Aug. 6, 2013, 2 pages.

* cited by examiner

OPTICAL SINGLE-SIDEBAND TRANSMITTER

This application is a national phase of International Application No. PCT/GB2010/050463 filed Mar. 18, 2010 and published in the English language.

The invention relates to a device and method for modulating an optical carrier field with a single sideband signal. Applications exist in optical fibre telecommunications networks and optical fibre sensor networks.

BACKGROUND

It is well known that modulation formats generated electrically can be translated to optical frequencies by use of an optical single sideband (SSB) modulator. Because of the increased interest in the generation of more complex modulation formats to improve spectral efficiency there is a need for efficient and cost-effective methods for optical SSB modulation.

The usual method of generating optical SSB is to use one or more Mach-Zehnder Interferometer (MZI) arrangements. The arms of the MZI contain optical phase adjusters and electro-optic phase modulators. These are driven by a combination of electrical signals. The correct phase relationships to cancel (null) out the carrier and one set of sidebands is achieved using an appropriate combination of optical path lengths and control of the phase of the electrical drive signals. The resultant modulator is large (several cm long), often requiring special travelling-wave electrode structures, and is not well suited to optical integration in a photonic integrated circuit (PIC).

BRIEF SUMMARY OF THE DISCLOSURE

The present invention provides a device for modulating an optical carrier field with a single sideband signal as claimed in claim 1 and a method as claimed in claim 9. Optional features are described in the dependent claims.

According to the invention a much more compact architecture is possible, at least in preferred embodiments, based on optical intensity modulators (typically 100 um long) in the arms of a Michelson Interferometer. Reflection-mode electro-absorption modulators (REAMs), placed at the ends of each arm of the interferometer, may be driven by suitably phased electrical modulating signals. The relative optical path length of the two arms may be adjustable so that the correct optical phase relationship between the modulated optical carriers can be obtained. The Michelson Interferometer is inherently more compact than the MZI and is ideally suited to REAM technology. The small size, wide bandwidth, and low operating voltage of REAMs is also a major advantage for producing array devices suitable for PICs.

In broad terms, a method for generating an optical single sideband signal, the method comprising the steps of splitting an optical field into two parts and introducing a relative phase delay of $+/-\pi/4$ radians in each direction of transmission to one of the parts, intensity reflection-modulating each part with electrical signals having a relative phase delay of $+/-\pi/2$ radians and then recombining the reflection-modulated signals.

The reflection-modulators may be reflection electro-absorption modulators (R-EAMs). The optical splitting, combining and phase delay means may be performed by silica on silicon waveguides. The component parts may be assembled on a hybrid photonic integrated circuit.

The optical splitting, combining and phase delay means may be performed by indium phosphide waveguides. The component parts may be assembled on a monolithic photonic integrated circuit.

Additional optical splitters, combiners, and phase adjusters may be used to remove, or reduce, the optical carrier. The outputs of two single sideband modulators may be combined. A phase adjuster may be used to control the level of the carrier.

A number of single sideband generators or component parts may be combined on one or more hybrid or monolithic photonic integrated circuits.

There is also disclosed a feedback control system to optimise the residual optical carrier level by controlling the phase, and amplitude, of the component signals within the SSB generator.

BRIEF DESCRIPTION OF THE DRAWINGS

Embodiments of the invention are further described hereinafter with reference to the accompanying drawings, in which.

DETAILED DESCRIPTION

Figure 1:
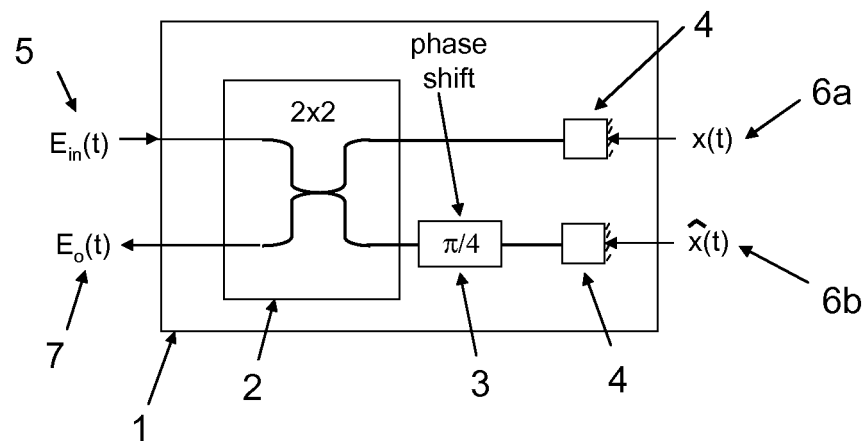
FIG. 1 is a schematic representation of a single sideband (SSB) modulator according to an embodiment of the invention.

FIG. 1 illustrates a first embodiment of the optical single sideband modulator 1 employing reflection-mode optical intensity modulators 4. The reflection-mode intensity modulators can be based on reflective electro-absorption-modulators (REAMs), an example of this technology is the R-EAM-1550 Reflective EAM manufactured by CIP Technologies of Ipswich, UK (www.ciphotonics.com/PDFs_March09/R_EAM_1550_D.pdf). A continuous wave optical field $E_{in}(t)$ is applied to the input arm 5 of an optical coupler 2 that has a nominal power splitting/combining ratio of 50% (3 dB). The input light is split into two equal parts by the coupler 2 and guided to the reflective intensity modulators 4. One of the parts is subjected to an optical phase shift 3 of $\pi/4$ radians on its journey towards the intensity modulator 4 and a further $\pi/4$ phase shift on its return. The net result is a relative optical phase difference of $\pi/2$ radians between the reflected signals on the two arms. A message bearing electrical signal x(t) and its Hilbert transform x^(t) are applied (along with any dc bias voltages) to the electrical inputs 6a, 6b of the respective reflective intensity modulators 4. The resulting optical field $E_o(t)$ on the output 7 of the coupler 2 is then given by the following equation:

$$E_o(t)=0.5A\cdot\{[1+m\cdot x(t)]^{0.5}\cdot\text{Cos}(wt)-[1+m\cdot\hat{x}(t)]^{0.5}\cdot\text{Sin}(wt)\} \quad (1)$$

where A is the amplitude of the input field and m is the intensity modulator modulation index. The square root terms are due to the intensity modulation process. An ideal 2×2 coupler scatter matrix was used in deriving equation 1, see for example Agrawal, "Applications of Nonlinear Fiber Optics", Academic Press 2001).

A series expansion of the square root terms of Equation 1 gives:

$$E_o(t)=0.5A \cdot \{[1+m \cdot x(t)/2 - 0.25m^2 x^2(t)/2! + \cdots ] \cdot \mathrm{Cos}(wt) - [1+m \cdot \hat{x}(t)/2 - 0.25m^2 \hat{x}^2(t)/2! + \cdots ] \cdot \mathrm{Sin}(wt)\} \quad (2)$$

For low modulation index (m<<1) higher order terms in the series expansion can be ignored and the output is approximated by:

$$E_o(t) \sim (A/\sqrt{2}) \cdot [\mathrm{Sin}(wt-\pi/4) + m/(2\sqrt{2}) \cdot \{x(t) \cdot \mathrm{Cos}(wt) - \hat{x}(t) \cdot \mathrm{Sin}(wt)\}] \quad (3)$$

The first term in Equation 3 is the residual carrier and the other terms are the desired SSB signal. This type of SSB signal is called an SSB-TC where TC stands for transmitted carrier. The example SSB modulator described in FIG. 1 and by Equation 3 is used to generate the upper sideband signal. However, by adjusting the electrical phases of the modulating signals on the electrical inputs 6a and 6b and/or by adjusting the optical phase 3 a lower sideband signal can be created.

Due to imperfections in the balance of the optical splitting/combining ratios of the coupler 2 and differences in the optical path loss in the arms connecting the reflection modulators it may be desirable to adjust the electrical drive signal parameters, such as dc bias and modulating signal amplitude, in order to optimise the sideband suppression ratio. The phase shift element 3 may be implemented as a variable phase adjuster, based on a waveguide heater, as this offers an additional degree of freedom in setting the operating point of the SSB generator.

The Hilbert transform of a signal is equivalent to applying a π/2 phase shift to all of the frequency components of the signal. The modulating signal x(t), and its Hilbert transform $\hat{x}(t)$ at the electrical inputs 6a, 6b, can be virtually any type of information carrying waveform, ranging from a simple analogue or digital baseband signals, to a frequency division multiplex of many data signals. Applications range from point-to-point digital transmission systems to frequency division multiplexes of many data signals as used in cable access television (CATV) systems for example.

Figure 2:
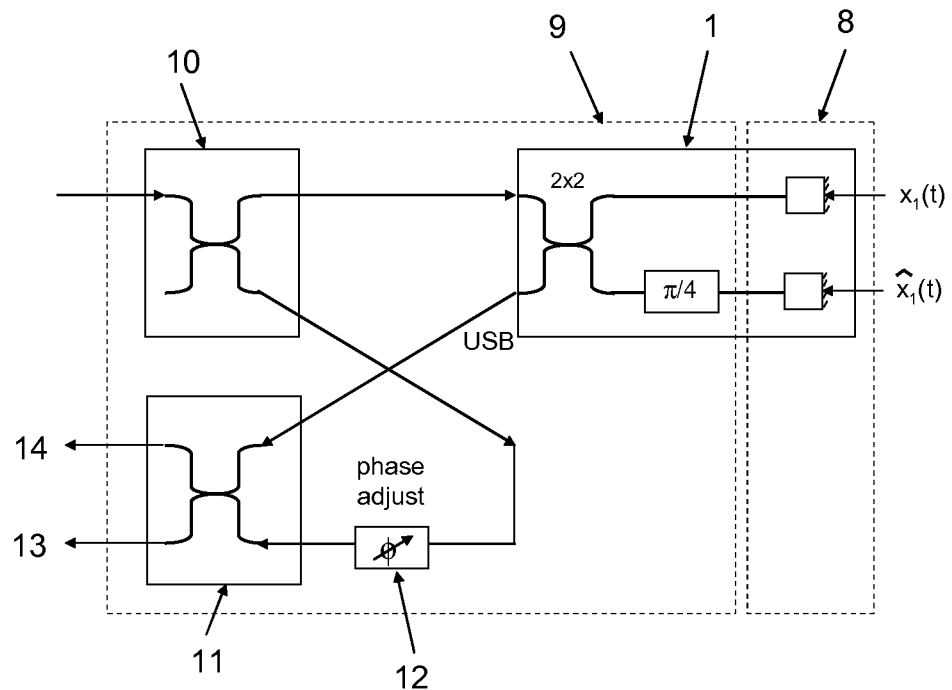
FIG. 2 is a schematic representation of a single sideband (SSB) modulator with means for suppressing the carrier according to an embodiment of the invention.

FIG. 2 illustrates a second embodiment that can be used to suppress the optical carrier component shown in Equation 3. In this embodiment the input field is split into two parts by a coupler 10, one part is sent to the SSB-TC generator 1 described previously in relation to FIG. 1 whilst the second part is subtracted from the SSB-TC signal at an output port coupler 11 to create an SSB suppressed carrier (SSB-SC) signal. Subtraction is accomplished in the coupler 11 by adjusting the phase of the carrier with the adjustable phase element 12. The adjustable optical phase element 12 could be placed on either input port to coupler 11 as all that matters is the relative phase of the two carriers when they combine in coupler 11. When the phase 12 is correctly set to minimise the carrier on output port 13 the carrier will appear instead on output port 14 where it can be monitored as part of a feedback control system used to optimise the phase adjuster 12. A variable optical attenuator could be placed in either output port of coupler 10, or input port of coupler 11, in order to allow the amplitudes of the two carriers to be balanced to give maximum carrier suppression when they are combined in anti-phase in coupler 11.

FIG. 2 also shows how an array of reflective intensity modulators 8 can be assembled onto a common substrate for edge connecting to a Silica on Silicon planar waveguide structure 9.

Figure 3:
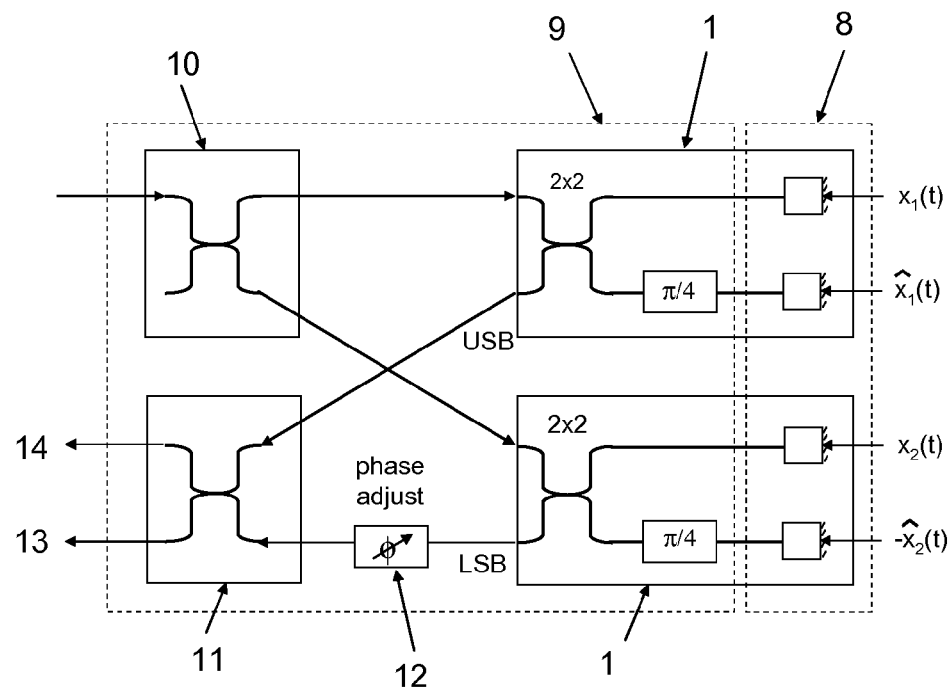
FIG. 3 is a schematic representation of a single sideband (SSB) modulator with an alternative means of suppressing the carrier and at the same time adding an independent sideband signal according to an embodiment of the invention.

FIG. 3 illustrates a third embodiment that can be used to suppress the optical carrier and add an independently modulated lower sideband signal. In this embodiment the input signal is split into two parts by coupler 10, each part is sent to an SSB-TC generator 1 and the corresponding SSB-TC output signals are combined in coupler 11 after one of the SSB-TC signals has been delayed by a phase adjuster 12. The phase adjuster 12 allows the relative phase of the carrier components of the two SSB-TC signals to be made π radians (180 degrees) out of phase so that they cancel on the output port 13. The result is two SSB-SC signals, one containing the upper sideband signals of message $x_1(t)$ and the other containing the lower sideband signals of message $x_2(t)$. The phase adjuster 12 could be placed on either of SSB-TC generator 1 outputs as the objective is simply to create a π radians (180 degrees) phase shift on the carriers when they are combined in coupler 11. Similarly, the message signals can be placed on the upper or the lower sidebands simply by adjusting the relative phase of their electrical drive signals 6a and 6b. When the phase 12 is correctly set to minimise the carrier on output port 13 the carrier will appear instead on output port 14 where it can be monitored as part of a feedback control system used to optimise the phase adjuster 12.

A variable optical attenuator could be placed in either output port of coupler 10, or input port of coupler 11, in order to allow the amplitudes of the two carriers to be balanced to give maximum carrier suppression when they are combined in anti-phase in coupler 11.

The advantages of the proposed method of SSB generation are summarised below:
  Due to its reduced size, the reflection-mode architecture of the proposed SSB generator is better suited to photonic integrated circuit (PIC) implementations using either the hybrid or monolithic approaches to PIC fabrication.
  Reflection intensity modulators, such as R-EAMs, are very compact (~100 um long) compared to optical phase modulators (~1 cm long), have a wide-bandwidth (over 20 GHz) without having to resort to travelling wave electrode structures, and only require low drive voltages.

Figure 4:
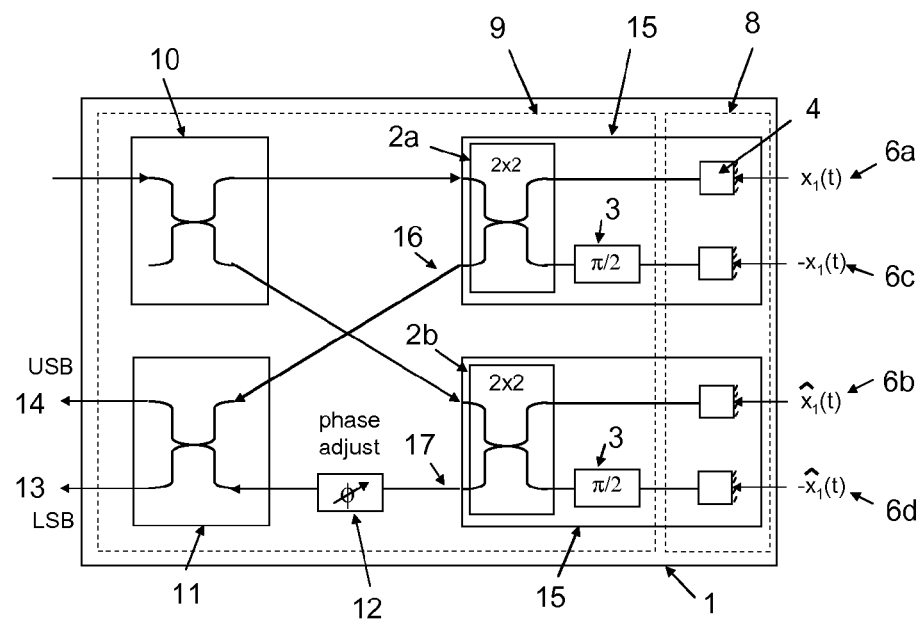
FIG. 4 is a schematic representation of a single sideband (SSB) modulator according to another embodiment of the invention.

FIG. 4 illustrates an alternative embodiment of the optical single sideband modulator 1 based on a modified version of the SSB-SC modulator shown in FIG. 3. In this embodiment the optical phase shift 3 is set to give π/2 radians shift to the light on its journey towards the intensity modulator 4 and a further π/2 phase shift on its return. The net result is a relative optical phase difference of π radians between the reflected signals on the two arms. A message bearing electrical signal $x_1(t)$ is applied at electrical input 6a, its inverse $-x_1(t)$ is applied at electrical input 6c, and the signal's Hilbert transform $\hat{x}_1(t)$ is applied at electrical input 6b and its inverse $\hat{x}_1(t)$ is applied at electrical input 6d (along with any dc bias voltages) to the reflective intensity modulators 4. The resulting optical field $E_o(t)$, at the output 16 of the coupler 2a, is now given by Equation 4:

$$E_o(x_1 t)=0.5^{-3/2} \cdot E_i \cdot \{[1+m \cdot x_1(t)]^{0.5} - [1-m \cdot x_1(t)]^{0.5}\} \quad (4)$$

where $E_i$ is the input optical field and m is the intensity modulator modulation index. The square root terms are due to the intensity modulation process. An ideal 2×2 coupler scatter matrix was used in deriving Equation 4, see for example Agrawal, "Applications of Nonlinear Fiber Optics", Academic Press 2001. Using a series expansion of the square root terms, Equation 4 simplifies to:

$$E_o(x_1 t)=0.5^{-3/2} \cdot E_i \cdot \{[m \cdot x_1(t)]/2 - [m \cdot x_1(t)]^2/8 + [m \cdot x_1(t)]^3/16 + \cdots - [m \cdot x_1(t)]/2 + [m \cdot x_1(t)]^2/8 - [m \cdot x_1(t)]^3/16 + \cdots \} \quad (5)$$

which simplifies further to . . .

$$E_o(x_1 t)=0.5^{-3/2} \cdot E_i \cdot \{[m \cdot x_1(t)]+[m \cdot x_1(t)]^3/8+---\} \quad (6)$$

The important observation here is that all of the even order harmonics cancel leaving only the odd order terms. Equation 6 only shows the series expansion terms up to powers of 3. Ignoring the higher order (odd harmonic) terms has negligible impact when the modulation depth m<1, and all of the even order harmonics cancel anyway.

Similarly, the resulting optical field $E_o(t)$, at the output 17 of the coupler 2b, is now given by Equation 7:

$$E_o(x\hat{\,}_1 t)=0.5^{-3/2} \cdot E_i \cdot \{[m \cdot \hat{x}_1(t)]+[m \cdot \hat{x}_1(t)]^3/8+---\} \quad (7)$$

The signals described by Equations 6 and 7 are combined in coupler 11 with a relative phase shift of φ radians due to the phase adjuster 12. If this phase difference is set to +/−π/2 radians, then the signals on output ports 13 and 14 become:

$$E_o(t)=0.25 \cdot E_i \cdot \{[m \cdot x_1(t)]+[m \cdot x_1(t)]^3/8+/-j \cdot ([m \cdot \hat{x}_1(t)]+[m \cdot \hat{x}_1(t)]^3/8)\} \quad (8)$$

where j represents the square root of −1. One signal, corresponding to either +j or −j, will appear on one output port and the corresponding signal with opposite sign will appear on the other output port.

For low modulation index (m<<1) higher order terms in the series expansion can be ignored and the output is approximated by:

$$E_o(t) \approx 0.25 \cdot E_i \cdot \{[m \cdot x_1(t)]+/-j \cdot [m \cdot \hat{x}_1(t)]\} \quad (9)$$

Equation 9 is immediately recognisable as the classic equation for an SSB signal. One sign of j (−) corresponding to a lower side-band SSB signal, the other (+) corresponding to an upper side-band SSB signal. Thus, the two output ports 13, 14 will have opposite side-band SSB signals. The main difference between this result and that given earlier in Equation 3 is that the carrier and all of the even-order harmonics have been eliminated. However, this improvement in signal quality is achieved at the expense of reduced efficiency since only one SSB signal is generated on each output port.

Due to imperfections in the balance of the optical splitting/combining ratios of the coupler 2 and differences in the optical path loss in the arms connecting the reflection modulators it may be desirable to adjust the electrical drive signal parameters, such as dc bias and modulating signal amplitude, in order to optimise the sideband suppression ratio. The phase shift elements 3 and 12 may be implemented as a variable phase adjuster, based on a waveguide heater, as this offers an additional degree of freedom in setting the operating point of the SSB generator.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A device for modulating an optical carrier field with a single sideband signal, the device comprising:
    an optical input for an optical carrier signal;
    an optical output for a modulated optical output signal;
    a first optical splitter arranged to split the optical carrier signal into a first component signal and a second component signal;
    a first reflection modulator arranged to intensity modulate the first component signal with only a first electrical signal;
    a second reflection modulator arranged to intensity modulate only the second component signal with only a second electrical signal, the second electrical signal corresponding to the first electrical signal with a relative phase delay of +/−π/2 radians;
    a first optical combiner arranged to recombine the modulated first component signal and the modulated second component signal to produce an optical output signal; and
    a first phase delay arranged to apply a phase delay of +/−π/2 radians to one of the component signals before the component signals are recombined by the first optical combiner;
    wherein the first optical splitter and the first optical combiner are disposed in a first coupler.

2. A device as claimed in claim 1, wherein the first phase delay is arranged to apply a phase delay of +/−π/4 radians to one of the component signals before reflection modulation and then to apply a phase delay of +/−π/4 radians to that component signal after reflection modulation.

3. A device as claimed in claim 1, further comprising
    a second optical splitter interposed between the optical input and the first optical splitter, and
    a second optical combiner interposed between the first optical combiner and the optical output, and
    a second phase delay arranged to apply a phase delay to one input of the second optical combiner,
    wherein the second optical splitter is arranged to split the optical carrier signal between the first optical splitter and the second optical combiner, the second optical combiner is arranged to combine the optical carrier signal at one of its inputs with the output of the first optical combiner at the other of its inputs, and the relative phase delay due to the second phase delay is configured to remove the optical carrier from the optical output signal at the optical output.

4. A device as claimed in claim 3, wherein the second optical combiner has two outputs, the first output for the optical output signal at the optical output of the device and wherein the device comprises a feedback mechanism which adjusts the phase delay applied by the second phase delay to maximise the optical carrier output at the second output of the second optical combiner.

5. A device as claimed in claim 3, wherein a second said device is interposed between the second optical splitter and the second optical combiner, whereby an input of the first optical splitter of the second device is connected to an output of the second optical splitter and an input of the second optical combiner is connected to an output of the first optical splitter of the second device.

6. A device as claimed in claim 1, further comprising:
a first additional optical splitter/combiner interposed between the first optical splitter and the first reflection modulator, the first additional optical splitter/combiner directing a portion of the first component signal to a first additional reflection modulator via a phase delay on both transmission and reflection of $+/-\pi/2$ radians,
a second additional optical splitter/combiner interposed between the second optical splitter and the second reflection modulator, the second additional optical splitter/combiner directing a portion of the second component signal to a second additional reflection modulator via a phase delay on both transmission and reflection of $+/-\pi/2$ radians,
wherein the combined output of the first additional optical splitter/combiner and the combiner output of the second additional splitter/combiner are combined by the first optical combiner, and
wherein the electrical signal applied to the first additional reflection modulator is inverse of the first electrical signal and the electrical signal applied to the second additional reflection modulator is inverse of the second electrical signal.

7. A device as claimed in claim 6, wherein the first phase delay is a variable phase delay.

8. A method for generating an optical single sideband signal, the method comprising the steps of splitting an optical field into two parts using a first coupler, intensity reflection-modulating each part with only one of two electrical signals, the two electrical signals having a relative phase delay of $+/-\pi/2$ radians, introducing a relative phase delay of $+/-\pi/2$ radians to one of the parts, and then recombining the reflection-modulated signals using the first coupler.

9. A method as claimed in claim 8, wherein the step of introducing a relative phase delay to one of the parts comprises introducing a relative phase delay of $+/-\pi/4$ radians in each direction of transmission (pre- and post-reflection modulation) to the said part.

10. A method as claimed in claim 8, wherein the reflection-modulation step uses reflection electro-absorption modulators (R-EAMs).

11. A method as claimed in claim 8, wherein the optical splitting, recombining and phase delaying are performed by silica on silicon waveguides.

12. A method as claimed in claim 8, wherein the optical splitting, recombining and phase delaying are performed by indium phosphide waveguides.

13. A method as claimed in claim 8, wherein the component parts are assembled on a hybrid photonic integrated circuit.

14. A method as claimed in claim 13, wherein the component parts are assembled on a monolithic photonic integrated circuit.

15. A method as claimed in claim 8, comprising removing or reducing an optical carrier using at least an additional optical splitter, combiner, and phase adjuster.

16. A method as claimed in claim 15 further comprising controlling the phase and amplitude of the combined signals by means of feedback to optimise removal of the optical earner.

17. A method as claimed in claim 8, wherein the outputs of two single sideband modulators are combined.

18. A method as claimed in claim 17, wherein a phase adjuster is used to control a level of the carrier.

19. A method as claimed in claim 8, wherein a plurality of single sideband generators or component parts are combined on one or more hybrid or monolithic photonic integrated circuits.

* * * * *